Figures 1, 2:
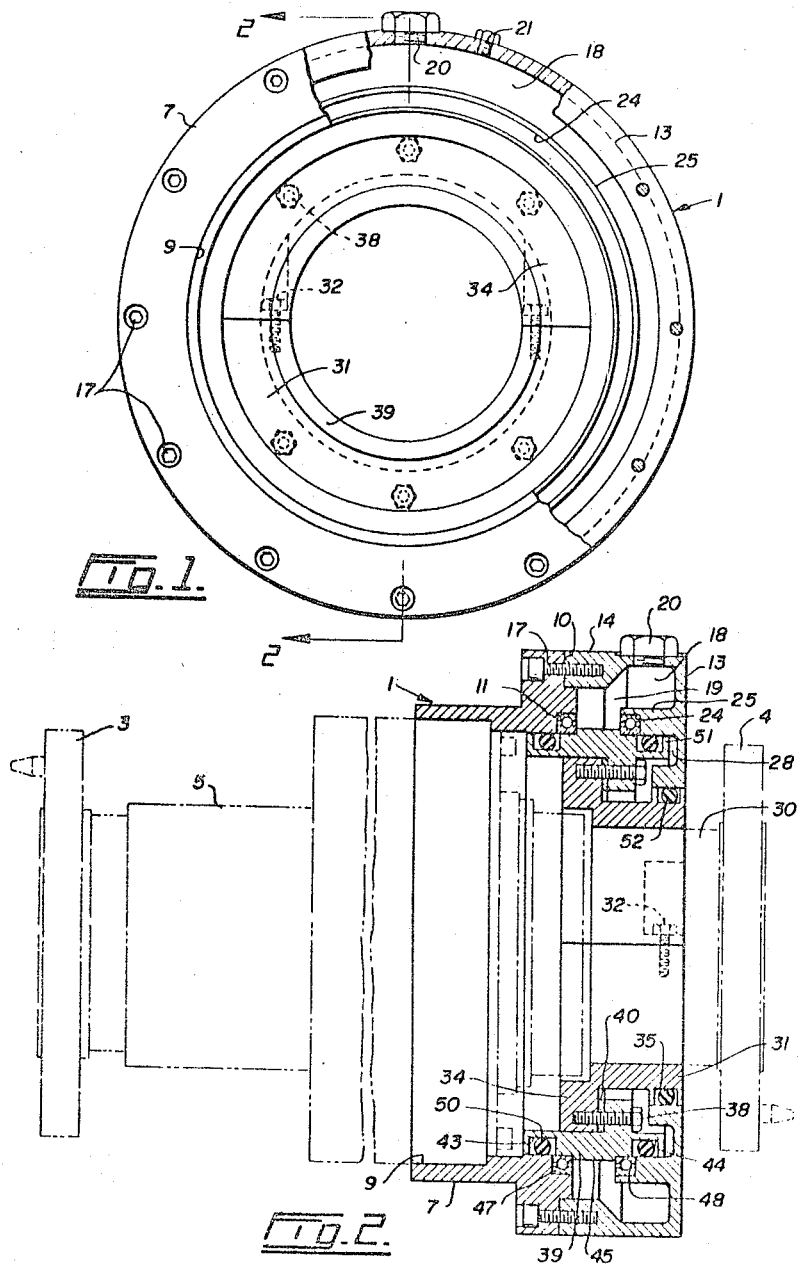

United States Patent Office 3,309,114
Patented Mar. 14, 1967

3,309,114
ROTATABLE JOINT FOR A WAVEGUIDE
Geoffrey William Morton, Bells Corners, Ontario, Canada, assignor to Her Majesty the Queen in right of Canada as represented by Canadian Patents and Development Limited, Ottawa, Ontario, Canada
Filed May 28, 1964, Ser. No. 371,045
Claims priority, application Canada, May 29, 1963, 876,716
1 Claim. (Cl. 285—11)

This invention relates to a rotatable joint for a waveguide and more particularly relates to a form of seal for the rotatable joint of a waveguide.

It is usual practice to fill the interior of a waveguide with gas under pressure and consequently all the joints in a waveguide system must be gas tight. Otherwise a waveguide pressurizing system would be required which would be, in most applications, quite undesirable. The problem of providing an effective gas-tight seal for a rotatable joint in a waveguide is one which has consistently proven difficult to solve and consequently numerous attempts have been made in the past to provide practical and efficient solutions to this problem without any one of the solutions so far arrived at proving entirely satisfactory.

For example, it has been known to employ a column of mercury to counterbalance the pressurized gas tending to escape at the joint but the disadvantage of such an arrangement has been that there is only one position in which such a form of apparatus can be mounted so that the column of mercury will be effective for its purpose. Also of course conventional types of seals such as O-rings have been employed but none have proven to be entirely satisfactory.

Further prior art consists of United States Patent No. 3,011,137 issued November 28, 1961 to Albanese et al. and United States Patent No. 2,768,358 issued October 23, 1956 to Moseley et al.

The present invention has for its object the provision of a rotatable joint for waveguides wherein the problem of sealing the pressurized gas is transferred to one of sealing a viscous fluid such as an oil.

In accordance with its broadest aspect this invention relates to a seal for a rotatable joint for waveguides and the like which comprises interconnected, relatively rotatable male and female joint members, said female member including a first, annular joint member, a first recess in said first joint member, a second, annular joint member including a base, said second joint member being secured to said first joint member by means of bolts threaded into said base, an annular chamber co-axially located in said second joint member, a liquid filler plug and a vent plug in said second joint member providing access to said chamber, an annular chamber inlet co-axial with said chamber and disposed radially inwardly from the outermost wall of said chamber, a second recess in said second joint member, and bearings, one being mounted in each of said first and second recesses; said male member including a third annular joint member provided with an annular flange and an annular groove, an O-ring mounted in said groove, a fourth annular joint member secured to said annular flange by means of bolts threaded into said flange, and a pair of annular grooves containing O-rings in said fourth joint member, said fourth joint member being rotatably mounted in said bearings.

A preferred embodiment of the present invention is illustrated in the accompanying drawings wherein:

FIGURE 1 is an end view with some parts broken away, and others sectioned, of a rotatable joint and seal therefor for waveguides and the like constructed in accordance with the present invention; and FIGURE 2 is a partially sectioned view taken along the line 2—2 of FIGURE 1 with some parts broken away and others shown in outline only.

Referring to the drawings, the rotatable joint, generally referred to by the reference numeral 1, is adapted to couple together two adjacent lengths of waveguide (not shown) having flanged ends alignable with and securable to flanges 3 and 4 provided on either end of the joint.

Flange 3 is secured to an extension 5 which in turn is secured to an annular joint member 7 which is substantially "L-shaped" in cross section. Member 7 is provided with a continuous, circumferentially extending, recess 9 within which extension 5 is secured as well as with two other circumferentially extending recesses 10 and 11.

Recess 10 is adapted to receive base 14 of an annular joint member 13 which in conjunction with member 7, extension 5 and flange 3 form the female portion of the rotatable joint. Member 13 is secured to member 7 by means of radially positioned screws 17 which are threaded into tapped holes in the base 14 of member 13.

Member 13 is provided within its interior with an annular chamber 18 having a substantially rectangular cross section and provided with an annular inlet 19 disposed radially inwardly from the outermost wall of chamber 18. An oil filler plug 20 and a vent plug 21 provide access to chamber 18 for a purpose to be described.

Member 13 is further provided with a circumferentially extending recess 24 which is located adjacent the free end of a projecting flange 25 separating chamber 18 from a circumferentially extending groove 28.

The male member of the rotatable joint includes the aforementioned flange 4 and a short extension 30 which has secured to it annular joint member 31 formed from two semi-circular pieces of identical cross section which are clamped to extension 30 by means of bolts 32.

Member 31 includes a radially projecting annular flange 34 and a circumferentially extending groove 35.

Flange 34 of member 31 has secured to it by means of bolts 38 a further annular joint member 39 with an annular washer 40 being interposed between flange 34 and the flange 41 of member 39 into which bolts 38 are threaded.

In addition to flange 41 member 39 includes a pair of circumferentially extending, continuous grooves 43 and 44 and a circumferentially extending shoulder 45.

Shoulder 45 maintains a pair of ball bearing races 47 and 48 mounted in recess 11 in member 7 and recess 24 in member 13 respectively in spaced apart relationship. Ball bearing races 47 and 48 permit relative rotation between the female portion of the joint and the male portion of the joint, the male portion consisting of flange 4, extension 30 and members 31 and 39. Additionally O-rings 50, 51 and 52, formed from any suitable material, are provided in grooves 43, 44 and 35 respectively with O-ring 52 being provided to prevent the entry of dust and dirt into the joint and O-rings 50 and 51 providing a seal for the oil contained in chamber 18.

In use, oil plug 20 and vent plug 21 are removed and chamber 18 is almost but not completely filled with oil or other suitable liquid. Plugs 20 and 21 are then replaced and the joint is ready for use. It may be used either in the horizontal as depicted in FIGURE 2 or alternatively in the vertical with flange 4 being uppermost. In use, assuming that a certain amount of pressurized gas escapes from the connecting joint between extensions 5 and 30 the gas will endeavour to pass by the seal provided by inner O-ring 50 and should it pass by this ring it will then pass through ball bearing race 47 and then into the oil in chamber 18 where it will rise to the surface of the oil no matter whether the joint is in the vertical or in the horizontal thus to be trapped in the chamber 18 and thereby prevented from escaping. O-ring 52 prevents any oil which passes through ball bearing race 48 from leaking from the joint.

In summary, a simple, practical and effective rotatable joint for waveguides and the like has been provided with this joint being of a type which replaces the problem of maintaining a seal effective to prevent the escape of pressurized gas to that of maintaining a seal effective to prevent the escape of a viscous fluid such as oil. A preferred embodiment has been disclosed by way of example only, the actual scope of the invention being as indicated in the appended claim.

I claim:

A rotatable joint for a waveguide comprising interconnected, relatively rotatable male and female joint members, said female member including a first, annular joint member, a second, annular joint member including a base, said second joint member being secured to said first joint member by means of bolts threaded into said base, an annular chamber coaxially located in said second joint member, a liquid filler plug and a vent plug in said second joint member providing access to said chamber and a liquid at least partially filling said chamber, an annular chamber inlet coaxial with said chamber and disposed radially inwardly from the outermost wall of said chamber and defined by portions of said first and second members, a first recess in said first joint member adjacent said inlet and a second recess in said second joint member adjacent said inlet, and bearings, one being mounted in each of said first and second recesses; said male member including a third annular joint member provided with an annular flange and an annular groove, an O-ring mounted in said groove and sealingly engaging said groove and a portion of said second member, a fourth annular joint member secured to said annular flange by means of bolts threaded into said flange, said fourth annular joint member extending across said annular chamber inlet and having a pair of grooves, said pair of annular grooves containing O-rings in sealing relationship with said fourth joint member and said first and second members, said fourth joint member being rotatably mounted in said bearings, and means maintaining said male and female joint members in assembled relationship.

References Cited by the Examiner
UNITED STATES PATENTS 2,379,547    7/1945    Sperry _____ 285—11
3,057,646    10/1962    Brumagim _____ 285—41

CARL W. TOMLIN, *Primary Examiner.*

THOMAS F. CALLAGHAN, *Examiner.*

D. W. AROLA, *Assistant Examiner.*